Feb. 2, 1965  C. S. COCKERELL  3,168,155
VEHICLES FOR TRAVELLING OVER LAND AND/OR WATER
Filed Jan. 17, 1961  3 Sheets-Sheet 1

Inventor
C. S. COCKERELL
By Cameron, Kerkam & Sutton
Attorneys

Feb. 2, 1965   C. S. COCKERELL   3,168,155
VEHICLES FOR TRAVELLING OVER LAND AND/OR WATER
Filed Jan. 17, 1961   3 Sheets-Sheet 2

Inventor
C. S. COCKERELL
By Cameron, Kerkam & Sutton
Attorneys

Feb. 2, 1965 C. S. COCKERELL 3,168,155
VEHICLES FOR TRAVELLING OVER LAND AND/OR WATER
Filed Jan. 17, 1961 3 Sheets-Sheet 3
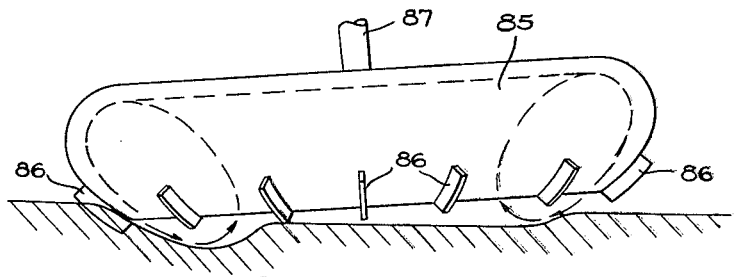
FIG. 12.
FIG. 13.
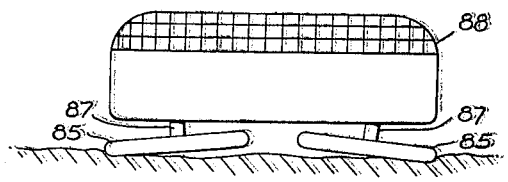
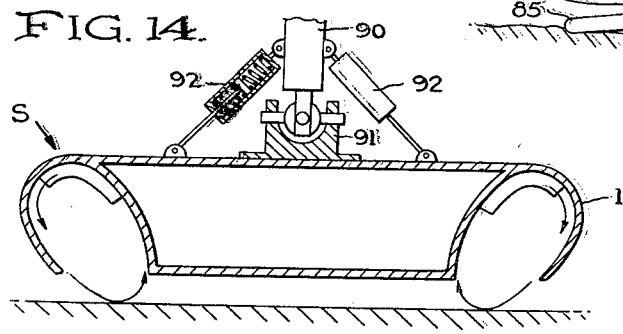
FIG. 14.
FIG. 15.
FIG. 16.
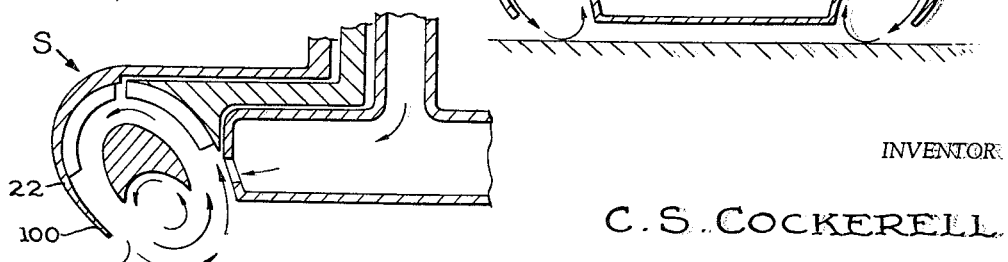
INVENTOR
C. S. COCKERELL
BY Cameron, Kerkam & Sutton
ATTORNEYS

United States Patent Office 3,168,155
Patented Feb. 2, 1965

3,168,155
VEHICLES FOR TRAVELLING OVER
LAND AND/OR WATER
Christopher Sydney Cockerell, Lymington, England, assignor to Hovercraft Development Limited, London, England, a British company
Filed Jan. 17, 1961, Ser. No. 83,276
Claims priority, application Great Britain, Jan. 19, 1960, 1,919/60
17 Claims. (Cl. 180—7)

This invention relates to vehicles for travelling over a surface and which are at least partly supported above that surface by a cushion of pressurised gas.

According to the invention there is provided a support member for a vehicle for travelling over a surface comprising at least one rotationally symmetrical deflecting member the deflecting surface of which has the shape of a surface of rotation the generatrix of which is a smooth curve which extends, with respect to the axis of rotation, outwardly and downwardly and then downwardly and inwardly, means mounted within the deflecting member and rotatable about the axis of symmetry of the deflecting member for causing air to flow outwardly to the deflecting member so as to be deflected downwards and inwards towards the surface over which the vehicle is operating to form a curtain of air, the curtain together with the bottom surface of the support member and the surface over which the vehicle is operating, enclosing a space in which a cushion of pressurised air is formed.

Figure 1:
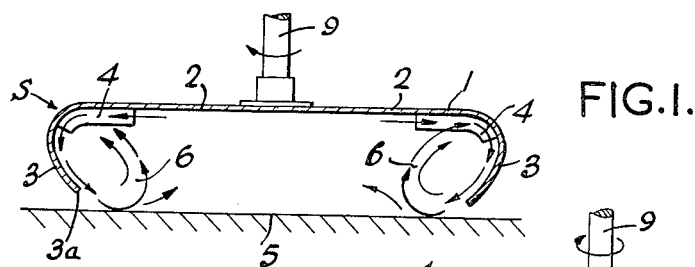
Figure 2:
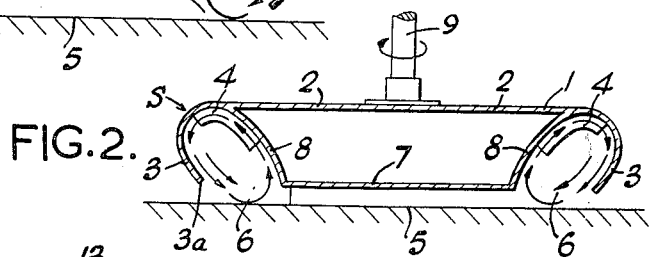
Figure 3:
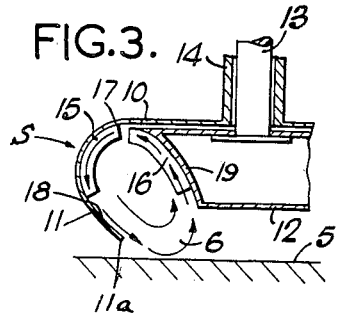
Figure 4:
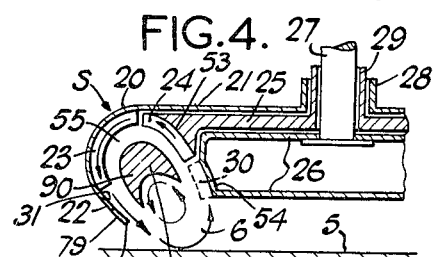
Figure 5:
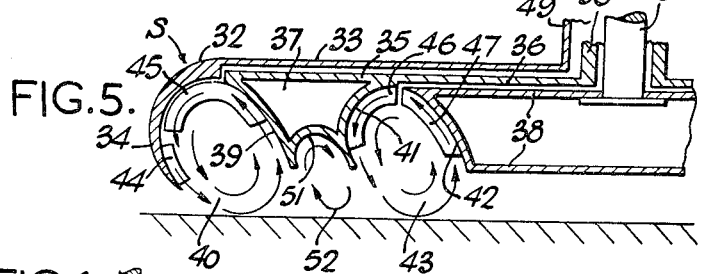
Figure 6:
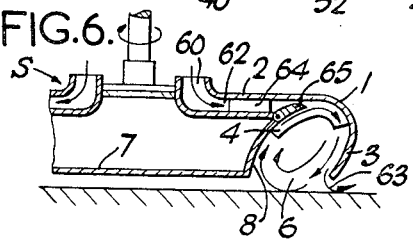
Figure 7:
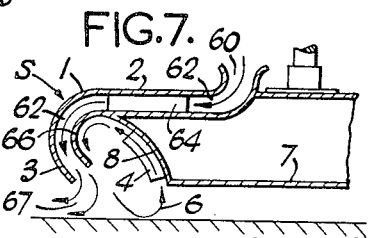
Figure 8:
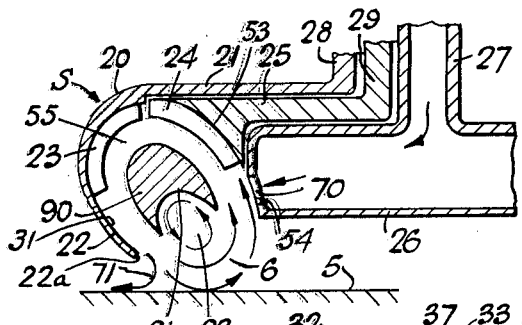
Figure 9:
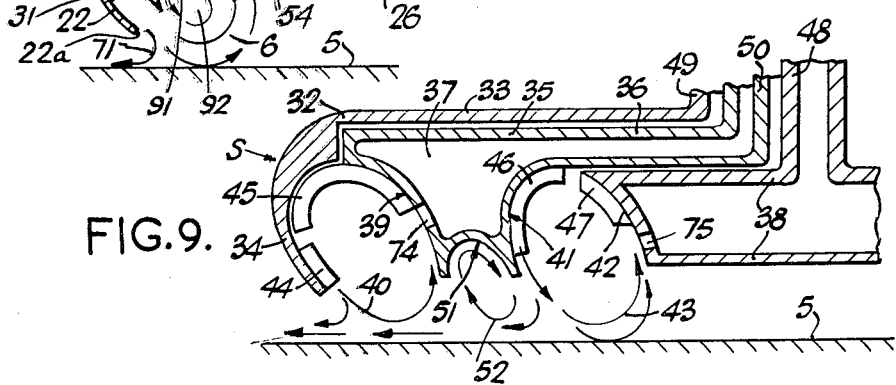
Figure 10:
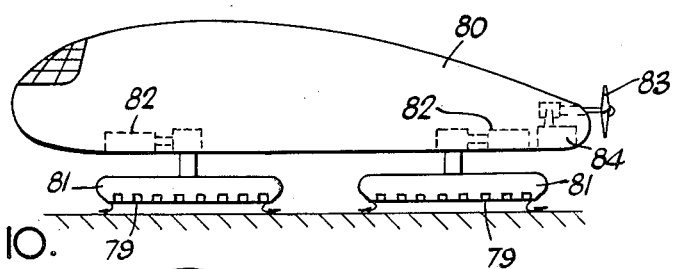
Figure 11:
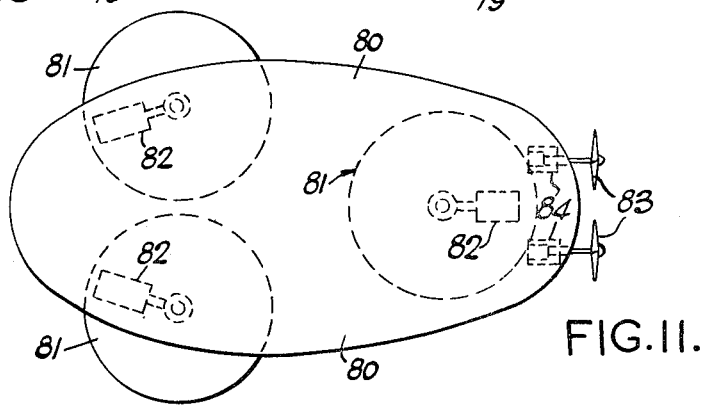

The invention may be readily understood by the following description of certain embodiments in conjunction with the accompanying drawings in which:

FIGURE 1 is a diagrammatic vertical cross-section of a rotatable support member illustrating the basis of the invention, FIGURE 2 is a modification of FIGURE 1, FIGURE 3 is a cross-section, similar to FIGURES 1 and 2, FIGURE 4 is a fragmentary cross-section showing a modification of FIGURE 3, FIGURE 5 is a fragmentary cross-section showing a further embodiment of the invention, FIGURE 6 is a fragmentary cross-section showing another embodiment of the invention, FIGURE 7 is a fragmentary cross-section showing a modification of FIGURE 6, FIGURE 8 is a fragmentary cross-section showing yet a further embodiment of the invention, FIGURE 9 is a fragmentary cross-section of yet another embodiment of the invention, FIGURE 10 is a side elevation of a vehicle embodying the invention, FIGURE 11 is a plan view of the vehicle illustrated in FIGURE 10, FIGURE 12 is a side view of a rotatable support member illustrating a means of driving the member, FIGURE 13 is a front elevation of a modified form of the vehicle embodying the invention, FIGURES 14 and 15 are diagrammatic vertical cross-sections of further forms of rotatable support members embodying the invention, and FIGURE 16 is a fragmentary cross-section of a modification of FIGURE 8.

FIGURE 1 illustrates diagrammatically the basis of the invention. The support member S comprises a rotatable member 1 in the form of a flat disc portion 2 having a deflecting member in the form of a peripheral portion 3 curved first outwards and downwards and then downwards and inwards and a rotatable shaft 9 fixed to the centre of disc portion 2. Vanes 4 are attached to the under surface of the disc portion 2, extending into the inner curved deflecting surface of the peripheral portion 3. On rotation of the support member by means of shaft 9, air flows from the central portion of the space beneath disc portion 2, i.e., that portion of said space which lies beneath shaft 9, outwardly to the peripheral portion 3 due to centrifugal force. On reaching the periphery the air is caused to flow downwards and inwards by the curved portion 3.

Considering the support member as being supported above a surface 5 in any suitable manner, as by retractable wheels, with an initial slight clearance between the bottom edge 3a of curved portion 3 and surface 5, and assuming maximum efficiency and, for convenience in describing the theory, ignoring all aerodynamic losses, the air flowing downwards and inwards issues from the bottom edge of the curved portion 3, in a direction inwards and towards the surface 5 over which the member is supported, drawing in additional air from the surrounding atmosphere. This additional air results in a gradual build up of the pressure of the air cushion beneath the support member S. Eventually the pressure of the cushion becomes sufficient to deflect the inward flow of air issuing from the bottom edge 3a of the curved portion 3 round and upwards until it joins the outward flow immediately beneath disc portion 2 which is produced by vanes 4. A closed vortex air curtain is thus formed as shown at 6. With the above assumptions, that is, maximum efficiency and ignoring losses, the vortex curtain 6 is capable of containing a pressurised cushion of air beneath the support member S.

The pressure of the cushion acts over the full vertical height of the vortex in the construction shown in FIGURE 1. This has a limiting effect on the cushion pressure which can be obviated to a considerable extent by lowering the centre portion of the rotatable member as shown in FIGURE 2. The vertical height of the cushion of pressurised air is reduced by having a further flat member 7 positioned beneath the disc portion 2, the periphery 8 of the flat member 7 being curved up in a concave manner to form a directing member which meets the peripheral portion. There is thus formed a constraining channel round the periphery of the rotating member for the vortex 6.

The velocity of the air forming the vortex 6 can be increased for the simple system described above and illustrated in FIGURES 1 and 2 by providing a further set of vanes, relative rotational movement occurring between the two sets of vanes. This relative movement may be obtained, for example, by having one set rotating with the rotatable member, the other set being stationary. An alternative method is for the two sets of vanes to be contrarotating.

FIGURE 3 shows the application of stationary vanes. The support member of this embodiment comprises a rotatable member 17 having a flat disc portion 10 and a downwardly curved deflecting member 11 the inner surface of which forms a deflecting surface 18, and a fixed member 12 supported from the vehicle by a stationary shaft 13, about which the rotatable member can rotate, being rotated by hollow shaft 14 surrounding the stationary shaft 13. The periphery of the fixed member 12 forms a directing member 19 which has a concave form and co-operates with the deflecting surface of the deflecting member 11 of the rotatable member to form a containing channel for the vortex 6. The deflecting member 11 has vanes 15 attached to its deflecting surface 18, and similar vanes 16 are attached to the concave surface of directing member 19 of the fixed member 12. When the rotatable member 17 is rotated, the vanes 15 and 16 co-act to provide a vortex form of air curtain having a higher inward radial velocity as it issues from the lower edge 11a of the deflector member 11 than would occur with one set of vanes. It will be readily appreciated that the positions of the rotatable member and fixed member can be reversed, that is, the inner member 12 may rotate while the outer member 17 is stationary.

FIGURE 4 illustrates an arrangement in which contra-rotating vanes are provided, the supporting member comprising a rotatable member, a contra-rotatable member and a stationary member. The rotatable member 20 comprises a flat disc portion 21 and a downwardly curved deflecting member 22. Vanes 23 are attached to the inner deflecting surface 31 of the deflector member 22. A further set of vanes 24 are attached to contra-rotatable member 25, the periphery 53 of this member having a concave form. Situated within the members 20 and 25 is a stationary member 26, the periphery 54 of which is also slightly concave. The deflecting member 22, and the concave peripheries 53 and 54 of the members 25 and 26 constitute flow defining members and co-operate to form a containing channel 55 for the vortex 6. The stationary member 26 is supported from the vehicle by a stationary shaft 27, the members 20 and 25 being supported and rotated by hollow shafts 28 and 29 respectively. In such an arrangement, the members 20 and 25 rotate in opposite directions, the two sets of vanes 23 and 24 co-acting to provide an increased inward radial velocity of the vortex air curtain as it issues from the lower edge 22a of the deflecting member 22. An additional set of stationary vanes may be provided on the periphery of the stationary member 26, as indicated by the dotted line 30. As in the example shown in FIGURE 3 and described above, variations in the relative positions of the rotating and stationary members can be varied. For example, member 25 could be the stationary member. Also the rotatable members can rotate in the same direction at different speeds. With member 25 as the stationary member, members 20 and 26 can rotate in the same direction at the same speed. Other examples of relative positioning and rotation of the members can readily be appreciated.

The invention is also applicable where multiple parallel curtains are required. An arrangement for forming two concentric vortex air curtains is illustrated in FIGURE 5. The arrangement shown comprises a rotatable member 32 having a disc portion 33 and a downwardly curved deflecting member 34, a further rotatable member 35 comprising a disc portion 36 and a thickened downward projecting rim portion 37, and a stationary member 38. The periphery 39 of the downward projecting rim portion 37 is of concave form and co-operates with the deflecting surface of the deflecting member 34 to form a containing channel for an outer vortex air curtain 40. The downward projecting rim portion 37 also forms a further deflecting member, the surface 41 being concave and forming a further deflecting surface. The periphery 42 of the stationary member 38 is of concave form and co-operates with the deflecting surface formed by the surface 41 to form a containing channel for an inner vortex air curtain 43. Sets of vanes 44, 45, 46 and 47 are attached to the deflecting surface of the deflecting member 34, the periphery 39 and deflecting surface 41 of the deflecting member portion of the downward projecting rim portion 37 and the periphery 42 of the stationary member 38, respectively. The stationary member 38 is supported from the vehicle by stationary shaft 48, hollow shafts 49 and 50 rotating the members 32 and 35, respectively. The bottom surface of the downward projecting rim portion 37 is preferably recessed as at 51, to facilitate the formation of a vortex 52 between the two vortices 40 and 43. As in the previously described example, variations in the relative positions of the rotating and stationary members can be provided, and all of the members 32, 35 and 38 can rotate, the relative rotations varying.

An alternative way of improving the operation of a rotating member is to provide a substantially continuous supply of new air to the, or each, vortex air curtain. Two methods of providing such additional air to the simple system illustrated in FIGURE 2, are shown in FIGURES 6 and 7, similar reference numbers being used where applicable. In FIGURE 6 an air intake 60 is formed in the disc portion 2 of the rotating member 1. A duct 62 connects the air intake 60 with the containing channel for the vortex air curtain 6, formed by the deflecting surface of the deflecting member 3 and the concave periphery 8 of the member 7. When the rotatable member is rotated air flows through the duct 62 to the vortex containing channel, and due to the increased radial path along which it flows has a velocity greater than would be obtained purely by the vortex. Also air is much more readily induced into the curtain system through the intake 60 than beneath the lower edge of the deflecting member 3. This provides easier and more certain formation of the vortex air curtain at starting, and once the curtain has been formed, and also the cushion which the curtain forms and contains, then air in excess of that required to maintain the curtain escapes to the atmosphere, as shown at 63. In addition to the vanes 4 within the deflecting member, vanes 64 may be provided in the duct 62. A movable flap 65 may also be provided for controlling the amount of air flowing through the duct 62 to the vortex air curtain.

FIGURE 7 illustrates an alternative method of supplying new air. The air intake 60 is formed in the disc portion 2 of the rotatable member 1, as before and communicates with the duct 62. Vanes 64 are provided in the duct to enhance the flow of air therethrough. In the present example, the duct is extended at its outer end, curving downwards inside the deflecting member 3. The inner wall 66 of the duct forms, with the concave periphery 8 of the member 7, a containing channel for the vortex air curtain 6, whilst the air induced through the duct 62 issues round the outside of the vortex, flowing in contact with the vortex for a short distance and then flowing outwards into the surrounding atmosphere, as shown at 67.

The feature of providing a substantially continuous supply of new air to the air curtains may also be applied to the examples in which sets of vanes having relative rotation are provided. FIGURES 8 and 9 illustrate two of such arrangements, FIGURE 8 being of a single vortex air curtain, and FIGURE 9 of a multiple vortex air curtain.

In FIGURE 8, the construction is generally as that shown in FIGURE 4, and similar reference numbers are used. The difference in FIGURE 8 is that air is fed via the shaft 27 into the interior of the stationary member 26 from which it issues through a series of ports 70. Thus as the members 20 and 25 rotate, the two sets of vanes 23 and 24 co-act to form the vortex curtain. The vortex flow of the air curtain 6 induces a flow of air through the ports 70, the air added by this to the vortex air curtain, flowing away into the surrounding atmosphere as shown at 71.

FIGURE 9 is similar to FIGURE 5, the difference in this arrangement being that air is provided via the shaft 50 to the rim portion 37, the air issuing through a series of ports 74 into the outer vortex air curtain 40. Air may also be supplied via the shaft 48 to the interior of the member 38, the air issuing through ports 75. Alternatively, the additional air may be supplied only to the inner vortex curtain 43.

Starting of the vehicle can be done in several ways. Where, for example, in FIGURE 3, the deflecting member is the only part which rotates, the rotary member must be supported initially clear of the surface. Where a further rotatable member is provided, such as the member 25 in FIGURE 4, the vehicle can rest on the surface. Rotation of the member 25 will then form a vortex air curtain, and the contained cushion, provided air can enter from the surrounding atmosphere. If the bottom edge of the deflecting member 22 is provided with slots 79 for example, as also shown in FIGURE 10, air can enter. The cushion thus formed will lift the vehicle a short distance from the surface and rotation of the member 20 can then commence. A more effective vortex air curtain will then be formed, the vehicle being supported at an increased height.

Where air is supplied as shown in FIGURES 8 and 9, then provided at least one of the members is clear of the surface initially the vortex air curtains can be formed together with the contained cushion or cushions, although the possible height that the vehicle will initially be lifted is limited.

In all the examples described, and in others not described, the vanes may be so formed, particularly at the ends from which the air is expelled, such that a straightening or other effect is produced. This effect may be used to offset the spiral path which could otherwise obtain, the air being expelled with a desired directional component.

A further modification, which is illustrated in FIGURES 4 and 8, is the provision of a centre-body 90. This centre-body is positioned within the space bounded by the concave surfaces of the deflecting member 22, the contra-rotatable member 25 and the stationary member 26. The provision of the centre-body 90 improves the formation of the vortex 6. Its bottom surface is preferably recessed in an arcuate manner as shown at 91, to induce the formation of a small vortex 92.

A vehicle will be supported, normally, by several of such members. FIGURES 10 and 11 illustrate a vehicle having a main body portion 80 supported by three rotatable members 81. The members are rotated by engines 82 and the vehicle is propelled by propellers 83 driven by engines 84.

The size, number and disposition of the members 81 may, of course, vary. Some of the members may have one form of construction as described above while others may have other forms as described above. Normally, when rotatable members are mounted on either side of the longitudinal centre-line of the vehicle, the members on one side will rotate in the opposite direction to those on the other side.

Where the vehicle is to operate over water, the rotating members can be caused to rotate by contact with the water. Such an arrangement is shown in FIGURE 12. The rotatable member 85 has a number of vanes 86 attached to the bottom edge of its periphery. The member is mounted at a slight angle, such as by inclining its shaft 87 as indicated in FIGURE 12. With members arranged on both sides of the longitudinal axis of the vehicle, which is normally the case, the axes of the shafts on one side of the longitudinal axis are tilted in the opposite direction to those on the other side as shown in FIG. 13. The inclination from the vertical of the axis of each shaft 87 is in a plane normal to the longitudinal axis of the main body 88 of the vehicle. Movement of the vehicle in a direction parallel to the longitudinal axis will cause rotation of the members 85 by inter-reaction between the vanes 86 and the water.

For operation over water, it can be arranged for the rotatable members to act as bouyancy chambers when the vehicle is at rest.

The form of air curtain which occurs is similar to the curtains formed in the vehicles described in co-pending application Serial No. 837,428, filed September 1, 1959, and now abandoned. This is particularly so when considering FIGURES 6 and 7 as the air added can be energised before being fed to the vortex and an injector action obtained.

In all cases, where air is supplied to the vortex air curtain, or curtains, it may be energised, such as by increasing its velocity and/or pressure, before being supplied. Where more than one supply of air is provided, as for example in FIGURE 9, each supply can be from a common source, or from separate sources which may be at the same or different energy levels.

The stability of the supporting member can be increased by subdividing the air cushion formed within the air curtain, as described in co-pending application Serial No. 16,677, filed March 22, 1960. The multiple air curtain systems as shown in FIGURES 5 and 9 have better inherent stability than the single air curtain systems due to the intermediate pressure occurring between the air curtains, the pressure being intermediate the cushion pressure and atmosphere. Further stability can be obtained in such multiple air curtain systems by dividing the annular area in which occurs the intermediate pressure into segments, as described in the above-mentioned co-pending application Serial No. 16,677.

Support members, of the various forms described, can be used as take-off and landing devices for aircraft. In such cases, the support members may be retractable, so that they are either contained partly or wholly within the aircraft fuselage and/or wings, or fit closely to the under-surface of the fuselage and/or wings. It can also be arranged that the support members are rotated, when in their operative position, by the engines used for propelling the aircraft in flight. Thus, for example, with gas-turbine propulsion engines, compressed air, or exhaust gases, or both, may be fed to a turbine which drives the rotatable member or members.

The support members may be attached to their shafts, or the shafts may be attached to the vehicle, by means of universal mountings which allow the support members to vary their attitude relative to the vehicle. For example, FIGURE 14 shows a support member 1 of the form illustrated in FIGURE 2 in which the rotatable member is connected to the driving shaft 90 by means means of a gimbal joint 91. With such an arrangement it is preferable that the degree of such variation is maintained within certain limits as by spring loaded members 92. This is particularly desirable when used as a landing and take-off device for aircraft as it is necessary to provide means for ensuring the correct attitude of the support members relative to the aircraft when it is landing so that any contact with the surface tends to assist the rotation of the rotating members and not to oppose such rotation.

The members may also be mounted on the main body of the vehicle so that they are capable of vertical and other movements relative to the body of the vehicle. Thus, as illustrated in FIGURE 15, a supporting member 95 similar to that illustrated in FIGURE 2 is provided with a shaft 96 which is slidably supported in a hollow driving shaft 97 journaled in the body of the vehicle. Springs 98 tend to maintain the shaft 96 at a given position relative to shaft 97, but allow a relative axial movement of the former to enable the body of the vehicle to maintain a substantialy level path when operating over rough ground or seas, there being a splined connection between the two shafts to enable the transmission of power from shaft 97 to shaft 96. The movement of each supporting member may be caused by the variation of the cushion pressure beneath it due to variation in the height between the supporting member and the surface over which it is operating. Alternatively the movement may be directly caused by power-operated means controlled by height variation, such for example as are described in co-pending appln. Ser. No. 837,502.

As an alternative to, or in addition to, the mounting of the support members so that they are capable of movement relative to the body of the vehicle, the lower part or parts of the support members can be formed of yieldable material. For example, as illustrated in FIGURE 16 which shows a modification of the construction of FIGURE 8, the lower portions 100 of the deflector members 22 can be of a flexible material, which will flex or yield on contact with the surface. The use of yieldable material will also enable the vehicle to alight on a rough surface,

I claim:

1. A support member for a vehicle for travelling over a surface comprising at least one rotationally symmetrical deflecting member located adjacent the periphery of the support member and having a deflecting surface which has the shape of a surface of rotation the generatrix of which is a smooth curve which extends, with respect to the axis of rotational symmetry, outwardly and downwardly and then downwardly and inwardly, and means mounted within the deflecting member and rotatable about the axis of symmetry of the deflecting member for causing air to flow outwardly from within the support member to the deflecting surface of the deflecting member so as to be deflected thereby downwards and inwards towards the surface over which the vehicle is operating to form a curtain of air, the bottom edge of the deflecting member being spaced outwardly from the remainder of the support member so as to provide an annular opening through which the curtain forming air flows both downwardly and upwardly to form a vortex curtain, the curtain together with the bottom surface of the support member and the surface over which the vehicle is operating enclosing a space in which a cushion of pressurised air is formed.

2. A support member for a vehicle for travelling over a surface comprising a rotatable member, deflecting member formed at the periphery of the rotatable member and having a deflecting surface which has the shape of a surface of rotation the generatrix of which is a smooth curve which extends, with respect to the axis of rotation of the rotatable member, outwardly and downwardly and then downwardly and inwardly, and vanes attached to the rotatable member for causing air to flow outwardly from beneath the rotatable member to the deflecting surface of the deflecting member so as to be deflected thereby downwards and inwards towards the surface over which the vehicle is operated to form a curtain of air, the curtain together with the bottom surface of the support member and the surface over which the vehicle is operating enclosing a space in which a cushion of pressurised air is formed.

3. A support member as claimed in claim 2 including a directing member within said deflecting member defining a return path for the air forming said curtain of air.

4. A support member as claimed in claim 3 wherein said directing member is also rotatable.

5. A support member as claimed in claim 1 comprising a deflecting member formed at the periphery of a stationary member, at least one rotatable member being mounted within the deflecting member and rotatable about the axis of symmetry of the deflecting member, and means attached to said rotatable member for causing the air to flow to the deflecting member.

6. A support member for a vehicle for travelling over a surface comprising at least one rotationally symmetrical deflecting member located adjacent the periphery of the support member and having a deflecting surface which has the shape of a surface of rotation the generatrix of which is a smooth curve which extends, with respect to the axis of rotational symmetry, outwardly and downwardly and then downwardly and inwardly, and means mounted within the deflecting member for causing air to flow outwardly from within the support member to the deflecting surface of the deflecting member so as to be deflected thereby downwards and inwards towards the surface over which the vehicle is operating to form a curtain of air, the curtain together with the bottom surface of the support member and the surface over which the vehicle is operating enclosing a space in which a cushion of pressurised air is formed, said means including a first directing member and a second directing member, the deflecting member and the two directing members constituting three flow defining members defining between them at least part of a constraining channel for the formation of the vortex air curtain, at least one of each pair of adjacent flow defining members being rotatable relative to the other and equipped with means for inducing air flow in said vortex air curtain on rotation of said rotatable flow defining member.

7. A support member as claimed in claim 6 wherein the centre-most of the three flow defining members is stationary.

8. A support member as claimed in claim 7 wherein the middle and outermost of the three flow defining members are contra-rotatable.

9. A support member as claimed in claim 1 comprising a plurality of coaxial deflecting members serving to form a plurality of air curtains.

10. A support member as claimed in claim 9 including a plurality of coaxial directing members associated with said deflecting members to define a plurality of coaxial constraining channels for the formation of a plurality of vortex air curtains.

11. A support member as claimed in claim 6 having at least one port in at least one of the directing members for supplying air to the vortex air curtain.

12. A support member as claimed in claim 11 wherein said port communicates with the constraining channel for the vortex adjacent the air entry to the deflecting member.

13. A vehicle for travelling over a surface including at least one support member comprising at least one rotationally symmetrical deflecting member located adjacent the periphery of the support member and having a deflecting surface which has the shape of a surface of rotation the generatrix of which is a smooth curve which extends, with respect to the axis of rotational symmetry, outwardly and downwardly and then downwardly and inwardly, and means mounted within the deflecting member and rotatable about the axis of symmetry of the deflecting member for causing air to flow outwardly from within the support member to the deflecting surface of the deflecting member so as to be deflected thereby downwards and inwards towards the surface over which the vehicle is operating to form a curtain of air, the bottom edge of the deflecting member being spaced outwardly from the remainder of the support member so as to provide an annular opening through which the curtain forming air flows both downwardly and upwardly to form a vortex curtain, the curtain together with the bottom surface of the support member and the surface over which the vehicle is operating enclosing a space in which a cushion of pressurised air is formed.

14. A vehicle as claimed in claim 13 wherein the deflecting member is rotatable about the axis of symmetry thereof and said axis is inclined to the vertical so that a part of the periphery of the deflecting member can be rotated by contact with the said surface when the vehicle moves.

15. A vehicle as claimed in claim 14 wherein the deflecting member is provided with peripheral surface engaging means for deriving driving effort from the surface.

16. A vehicle as claimed in claim 13 including at least three of said support members.

17. A vehicle as claimed in claim 13 including means for mounting the support member on said vehicle which are so constructed and arranged as to allow variation of the attitude of said support member towards the said surface.

References Cited by the Examiner
UNITED STATES PATENTS 2,340,427 2/44 Putt _____ 170—135
2,488,310 11/49 Mayer _____ 115—19

FOREIGN PATENTS 219,133 11/58 Australia.
410,221 3/10 France.
512,471 7/52 Belgium.
551,361 11/56 Italy.

A. HARRY LEVY, *Primary Examiner.*

PHILIP ARNOLD, *Examiner.*